(12) United States Patent
Kim et al.

(10) Patent No.: US 12,405,795 B2
(45) Date of Patent: Sep. 2, 2025

(54) PROCESSING-IN-MEMORY MEMORY DEVICE AND METHOD FOR PERFORMING INDIRECT ADDRESSING IN THE SAME

(71) Applicant: KOREA UNIVERSITY RESEARCH AND BUSINESS FOUNDATION, Seoul (KR)

(72) Inventors: Seon Wook Kim, Namyangju-si (KR); Seok-Young Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/678,520

(22) Filed: May 30, 2024

(65) Prior Publication Data
US 2024/0403053 A1    Dec. 5, 2024

(30) Foreign Application Priority Data

Jun. 5, 2023   (KR) .......................... 10-2023-0072180

(51) Int. Cl.
    *G06F 9/30*    (2018.01)
(52) U.S. Cl.
    CPC ...... *G06F 9/30145* (2013.01); *G06F 9/30043* (2013.01)
(58) Field of Classification Search
    CPC .......................... G06F 9/30145; G06F 9/30043
    See application file for complete search history.

(56) References Cited

U.S. PATENT DOCUMENTS

2021/0208801 A1* 7/2021 Song ..................... G06F 3/0604
2022/0398032 A1* 12/2022 Jeong ................. G06F 15/7821
2024/0143199 A1* 5/2024 Poremba ............... G06F 3/0629

FOREIGN PATENT DOCUMENTS

EP           3 637 265 B1      9/2021
KR     10-2019-0121402 A      10/2019
(Continued)

OTHER PUBLICATIONS

Richard Muri et al., "Embedded Processor-In-Memory Architecture for Accelerating Arithmetic Operations", IEEE High Performance Extreme Computing Conference (HPEC), Sep. 24, 2019, 7 pages, cited in NPL No. 2.
(Continued)

*Primary Examiner* — Michael J Metzger
(74) *Attorney, Agent, or Firm* — Hauptman Ham, LLP

(57) ABSTRACT

An embodiment of the present invention provides a processing-in-memory memory device comprising: a memory bank including a memory array for receiving a memory request from a memory controller, and a PIM engine for executing processing-in-memory according to the PIM instruction; and a processing-in-memory (PIM) control unit for controlling the processing-in-memory of the PIM engine by identifying a PIM instruction corresponding to the memory request, and storing addressing mode selection information for selecting one among an indirect address and a direct address according to the identified PIM instruction, wherein when the indirect address is used, the PIM control unit uses a register value of the processing-in-memory control unit as a base register value, reads an immediate value in the PIM instruction, a register value of the PIM engine, or an offset value of the memory bank, and generates an effective address for the processing-in-memory in an indirect addressing mode.

8 Claims, 9 Drawing Sheets

(56) References Cited

FOREIGN PATENT DOCUMENTS

| | | | |
|---|---|---|---|
| KR | 10-2022-0007403 | A | 1/2022 |
| KR | 10-2023-0014614 | A | 1/2023 |

OTHER PUBLICATIONS

Extended European Search Report dated Oct. 8, 2024 in connection with the counterpart European Patent Application No. EP24179995. 6, 7 pages.

\* cited by examiner

FIG. 8

PROCESSING-IN-MEMORY MEMORY DEVICE AND METHOD FOR PERFORMING INDIRECT ADDRESSING IN THE SAME

CROSS-REFERENCE TO RELATED APPLICATION(S)

The present application claims the benefit of priority to Korean Patent Application No. 10-2023-0072180 filed on Jun. 5, 2023, in the Korean Intellectual Property Office. The aforementioned application is hereby incorporated by reference in its entirety.

TECHNICAL FIELD

The present invention relates to a processing-in-memory memory device and a method of performing an indirect addressing mode in the device, and more specifically, to a processing-in-memory memory device that performs an indirect addressing mode of generating an effective address using a register and part of an instruction, and a method of performing an indirect addressing mode in the device.

BACKGROUND ART

In a computer architecture, a central processing unit (CPU) sequentially executes instructions converted from an application program written in a programming language. These instructions are configured of arithmetic instructions that perform arithmetic and logical operations for a specific CPU architecture, memory instructions that fetch or store data from or into the memory, and execution control instructions. At this point, an addressing mode means a process of calculating an effective address for accessing the memory when executing a memory instruction. The addressing mode is divided into a direct addressing mode and an indirect addressing mode according to a method of accessing the memory.

FIG. 1 is a view showing an example of a direct addressing mode.

Referring to FIG. 1, in the direct addressing mode, a memory instruction is configured of two parts including an opcode and an address. The opcode is a series of bits representing a specific operation or instruction that the CPU should execute. For example, the opcode may represent an instruction for loading an operand (data) from the memory to a register or storing an operand (data) from a register to the memory. The address is a location in the memory where data to be operated is stored or an operation result is stored. In the direct addressing mode, the address is explicitly specified in the instruction itself. That is, the direct addressing mode stores an effective address in the instruction. Accordingly, the direct addressing mode is used to reference statically addressed data, and the effective address maintains a constant value during execution of the program. When the CPU encounters a memory instruction of direct addressing, it identifies a specific operation to execute by decoding the opcode and performs the operation on the data stored at the specified address in the memory.

FIG. 2 is a view showing an example of an indirect addressing mode.

Referring to FIG. 2, in the indirect addressing mode, a memory instruction is configured of an opcode and an address in a way similar to the direct addressing method. However, the address is divided into two areas (fields) of a base register and an offset unlike the direct addressing mode. The base register is a CPU register that has the starting address of a memory block and functions as a reference point of the CPU when accessing the memory. The offset is a value added to the base register to calculate an effective address where data to be operated is stored or an operation result is stored. The value (offset value) stored in the offset area may be a constant (immediate value) stored in the instruction (the case of i in FIG. 2) or a value stored in another register (the case of ii in FIG. 2). The CPU calculates an effective address by adding the offset value to the base register value and performs a specified operation on the data stored at the effective address. The indirect addressing mode provides more flexibility in memory access and is used to reference a data, pointer, or the like for which an address is dynamically specified. In addition, as data structures such as graphs, arrays, structs, and the like are widely used in latest application programs, the indirect addressing mode is frequently used.

Meanwhile, a Von Neumann architecture is configured of a central processing unit including an arithmetic logic unit (ALU) and a memory that stores instructions and data needed for operation, and in order to process data in a speedy way, it operates by storing the data in the cache, which is a high-speed and low-capacity memory. Since the cache may not be used efficiently as data used in the latest application programs, to which techniques such as machine learning (ML), natural language processing (NLP), and the like are applied, are very large in capacity and have low data locality, a memory bottleneck occurs, and system performance is lowered. In order to solve the memory bottleneck, a Processing-In-Memory (PIM) architecture, which mounts a simple operator inside the memory device and performs operation in the memory and transmits only the results of the operation to the central processing unit, is attracting attention.

However, when a memory instruction used in performing the processing-in-memory operates in the direct addressing mode, there exist limitations as follows. First, since the direct addressing mode statically determines the address in the assembly process, instructions of the processing-in-memory device should be repeatedly stored whenever the program is executed. Second, although the DRAM-based PIM structure is suitable for utilizing a look-up table (LUT) operation method using a large capacity repository, it has the disadvantage of having to read the entire LUT for operation. Third, since the latest application programs using machine learning and natural language processing techniques frequently use data structures such as graphs, arrays, structs, and the like and thus require a large capacity of memory, instructions used when performing the processing-in-memory also need to use an indirect addressing mode corresponding thereto.

DISCLOSURE OF INVENTION

Technical Problem

An object of the present invention is to provide a processing-in-memory memory device and a method of performing an indirect addressing mode in the device.

The technical problems to be achieved by the present invention are not limited to the technical problems mentioned above, and unmentioned other technical problems may be clearly understood by those skilled in the art from the following description.

Technical Solution

To accomplish the above object, according to one aspect of the present invention, there is provided a processing-inmemory memory device comprising: a memory bank for executing a standard memory request, generated by a memory controller that receives data, address, and instruction signals from a central processing unit (CPU), and a processing-in-memory (PIM) instruction, the memory bank including a memory array for receiving the standard memory request through a global bus, and a PIM engine for directly executing processing-in-memory according to the PIM instruction within the memory bank; and a processing-in-memory (PIM) control unit for controlling the processing-in-memory of the PIM engine by identifying a PIM instruction corresponding to a request received from the memory controller, and storing addressing mode selection information for selecting one among an indirect address and a direct address according to the identified PIM instruction, wherein when the indirect address is used, the PIM control unit uses a register value of the processing-in-memory control unit as a base register value, reads an immediate value in the PIM instruction, a register value of the PIM engine, or an offset value of the memory bank, and generates an effective address for the processing-in-memory in an indirect addressing mode.

In an embodiment of the present invention, when the indirect address is used, the processing-in-memory control unit may define the base register by expanding an opcode area of the PIM instruction, and allocate and store an address area of the PIM instruction as an offset area.

In an embodiment of the present invention, the processing-in-memory control unit may include: a request identification unit for identifying the PIM instruction by inspecting the request coming from the memory controller; an instruction decoding unit for extracting essential information including a control signal (PIM opcode), an operand, and a target address (bank ID) indicating a specific PIM operation to be performed decoding the identified PIM instruction, and extracting and storing an indirect address use signal as the addressing mode selection information and a data path for calculating an indirect address; control registers for storing the control signal (PIM opcode) extracted by the instruction decoding unit as $R_{opcode}$ (register opcode) and storing the target address as $R_{addr}$ (register address); and an effective address generation unit for generating an effective address by selecting either an indirect address or a direct address, and generating the effective address in the indirect addressing mode, when the indirect address use signal is received from the instruction decoding unit, by using the $R_{addr}$ as the base register value and reading and using the immediate value in the PIM instruction, the register value of the PIM engine, or a data value of the memory bank as an offset value.

In an embodiment of the present invention, the effective address generation unit may include: an addressing mode selection unit for selecting and outputting an input indirect address or direct address by using the indirect address use signal received from the instruction decoding unit as a control signal; an indirect address calculation unit for calculating the indirect address, when the indirect addressing mode is selected by the addressing mode selection unit, in a method of operating the base register value $R_{addr}$ input from the control register and the offset value and transferring the indirect address to the addressing mode selection unit; and an offset value selection unit for selecting an immediate value (Immediate) included in the PIM instruction itself, a register value of the PIM engine of the memory bank, or a data value of the memory bank as an offset value according to the data path, and transferring the offset value to the indirect address calculation unit, as a multiplexer (MUX) that selects an offset value loading path using a data path received from the instruction decoding unit to calculate the indirect address as a control signal.

In an embodiment 41 of the present invention, the addressing mode selection unit may output an indirect address when the indirect address use signal is "Indirect", and the offset value selection unit may output the immediate value (Immediate) stored in the PIM instruction itself as an offset value when the data path is "imm,", and select and output the value stored in the register of the PIM engine or the data value of the memory bank as an offset value when the data path is "reg.".

According to another aspect of the present invention, there is provided a method of performing an indirect addressing mode in a processing-in-memory memory device comprising a memory bank including a memory array and a PIM engine that directly executes processing-in-memory according to a PIM instruction, and a processing-in-memory control unit for controlling the memory bank, the method comprising the steps of: identifying the PIM instruction by decoding data, address, and instruction signals received from a central processing unit (CPU) and inspecting a request incoming from the memory controller that generates a standard memory request, by a request identification unit of the processing-in-memory control unit; decoding the identified PIM instruction, extracting essential information including a control signal (PIM opcode), an operand, and a target address (bank ID) indicating a specific PIM operation to be performed, and extracting and storing an indirect address use signal and a data path (datapath) for calculating an indirect address as addressing mode selection information, by the instruction decoding unit of the processing-in-memory control unit; storing the control signal (PIM opcode) extracted by the instruction decoding unit as $R_{opcode}$ (register opcode) of the control register, and storing the target address as $R_{addr}$ (register address), by the processing-in-memory control unit; receiving the indirect address use signal from the instruction decoding unit, by an effective address generation unit of the processing-in-memory control unit; and generating an indirect address by using the $R_{addr}$ as a base register value, and reading and using an immediate value in the PIM instruction, a register value of the PIM engine, or a data value of the memory bank as an offset value, by the effective address generation unit of the processing-in-memory control unit.

In an embodiment of the present invention, the method of performing an indirect addressing mode may further comprise the step of controlling, when the PIM control unit recognizes the PIM instruction, to connect the PIM engine to the memory array by a switch (PimS) so that the PIM engine may directly access data stored in the memory array.

In an embodiment of the present invention, the step of generating an indirect address may include: an addressing mode selection step of receiving the indirect address use signal from the instruction decoding unit, transmitting the indirect address use signal to an indirect address calculation unit as a control signal, and transmitting a data path for calculating the indirect address to an offset value selection unit as a control signal, by an addressing mode selection unit of the effective address generation unit; an offset value selection step of selecting an offset value loading path using the data path for calculating an indirect address received from the instruction decoding unit as a control signal, and selecting and transferring an immediate value (Immediate) included in the PIM instruction itself according to the data path, a register value of the PIM engine of the memory bank, or a data value of the memory bank as an offset value to the indirect address calculation unit, by an offset value selection unit of the effective address generation unit; an indirect address calculation step of calculating and transferring, when the control signal is received from the addressing mode selection unit, the indirect address in a method of concatenating the base register value and the offset value input from the control registers to the addressing mode selection unit, by the indirect address calculation unit of the effective address generation unit; and a step of selecting and outputting the indirect address transferred from the indirect address calculation unit, by the addressing mode selection unit.

Advantageous Effects

According to an embodiment of the present invention, there is provided a processing-in-memory control unit that performs an indirect addressing mode by providing a circuit capable of generating an effective address in an indirect addressing mode in the processing-in-memory control unit, and a memory device having the same.

According to an embodiment of the present invention, there is provided a method of performing an indirect addressing mode in a processing-in-memory memory device by using a register value of the processing-in-memory memory device as the base register or the offset value of the effective address when performing a PIM instruction.

The effects of the present invention are not limited to the effects described above, and should be understood to include all effects that can be inferred from the configuration of the present invention described in the detailed description or claims of the present invention.

BRIEF DESCRIPTION OF THE DRAWINGS

FIG. 8 is a view showing an example of accomplishing simplification of a matrix operation execution method by applying the processing-in-memory memory device and the method of performing an indirect addressing mode in the processing-in-memory memory device described in FIGS. 3 to 6.

BEST MODE FOR CARRYING OUT THE INVENTION

Figure 1:
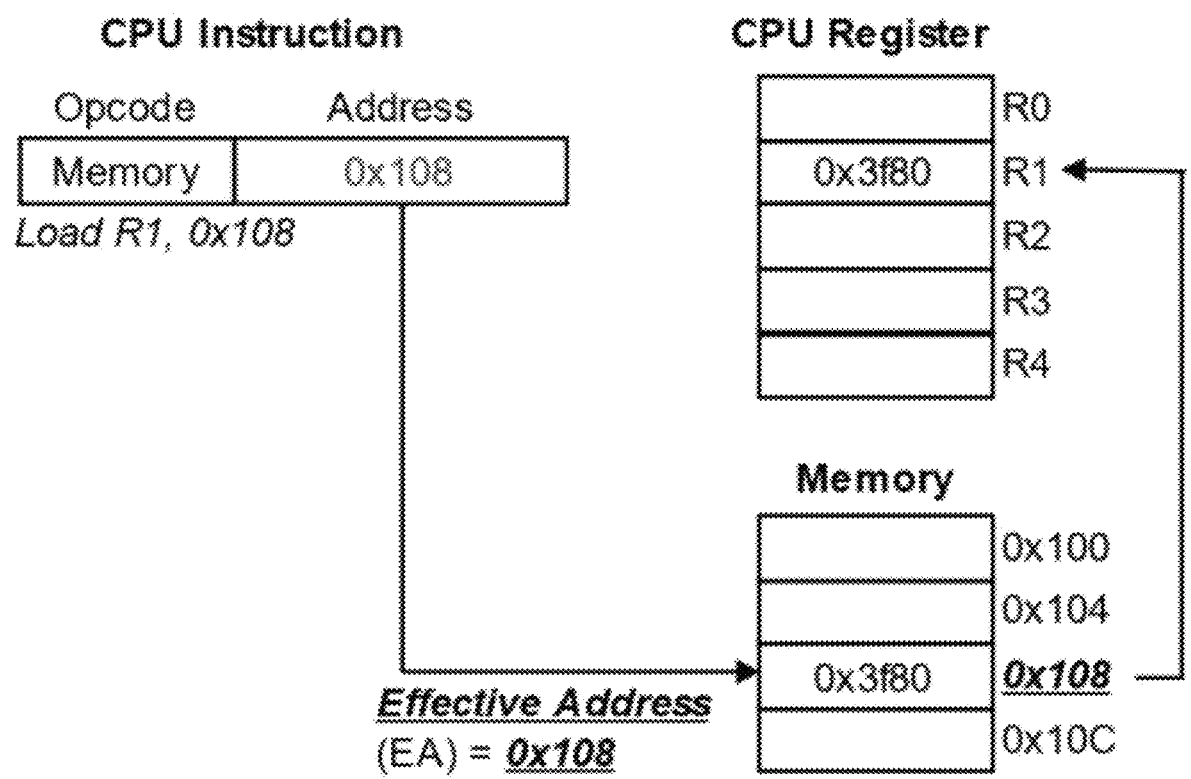
FIG. 1 is a view showing an example of a direct addressing mode.
Figure 2:
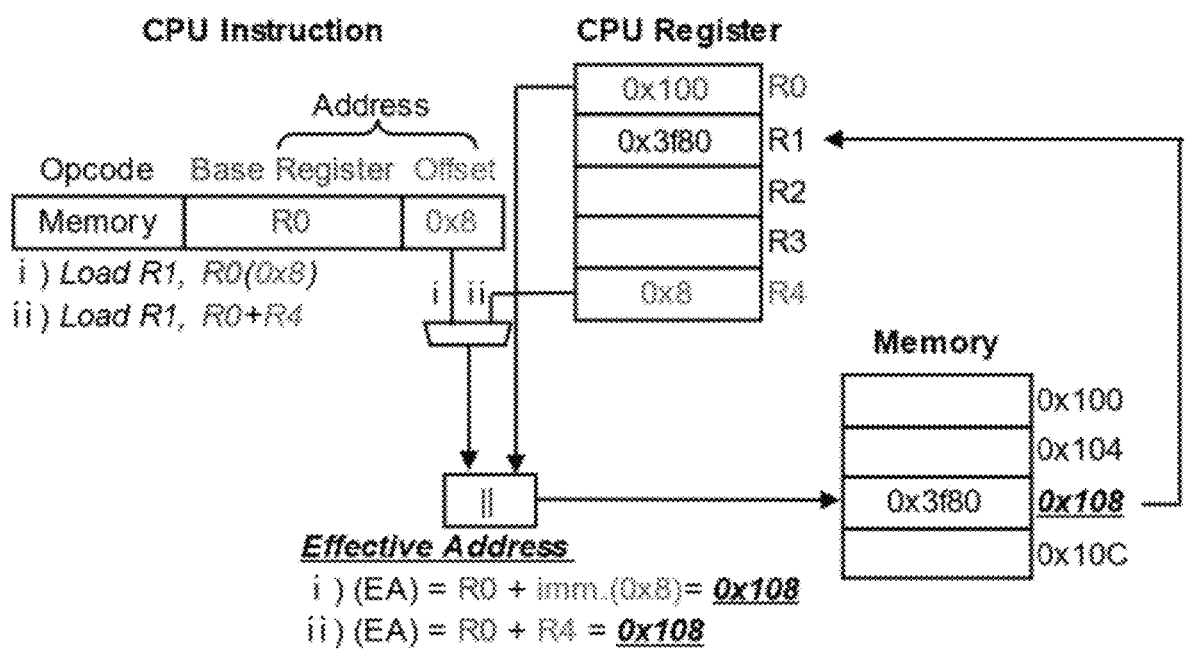
FIG. 2 is a view showing an example of an indirect addressing mode.

Since the present invention may make various changes and have various forms, specific embodiments will be illustrated in the drawings and described in detail in the description. However, this is not intended to limit the present invention to a specific disclosed form, and it should be understood to include all changes, equivalents, and substitutes included in the spirit and technical scope of the present invention. While describing each drawing, similar reference numerals are used for similar components.

Unless defined otherwise, all terms used herein, including technical or scientific terms, have the same meaning as commonly understood by those skilled in the art. Terms defined in commonly used dictionaries should be interpreted as having a meaning consistent with the meaning in the context of related technologies, and should not be interpreted in an ideal or excessively formal sense unless explicitly defined in this application.

Hereinafter, preferred embodiments of the present invention will be described in more detail with reference to the accompanying drawings.

Figure 3:
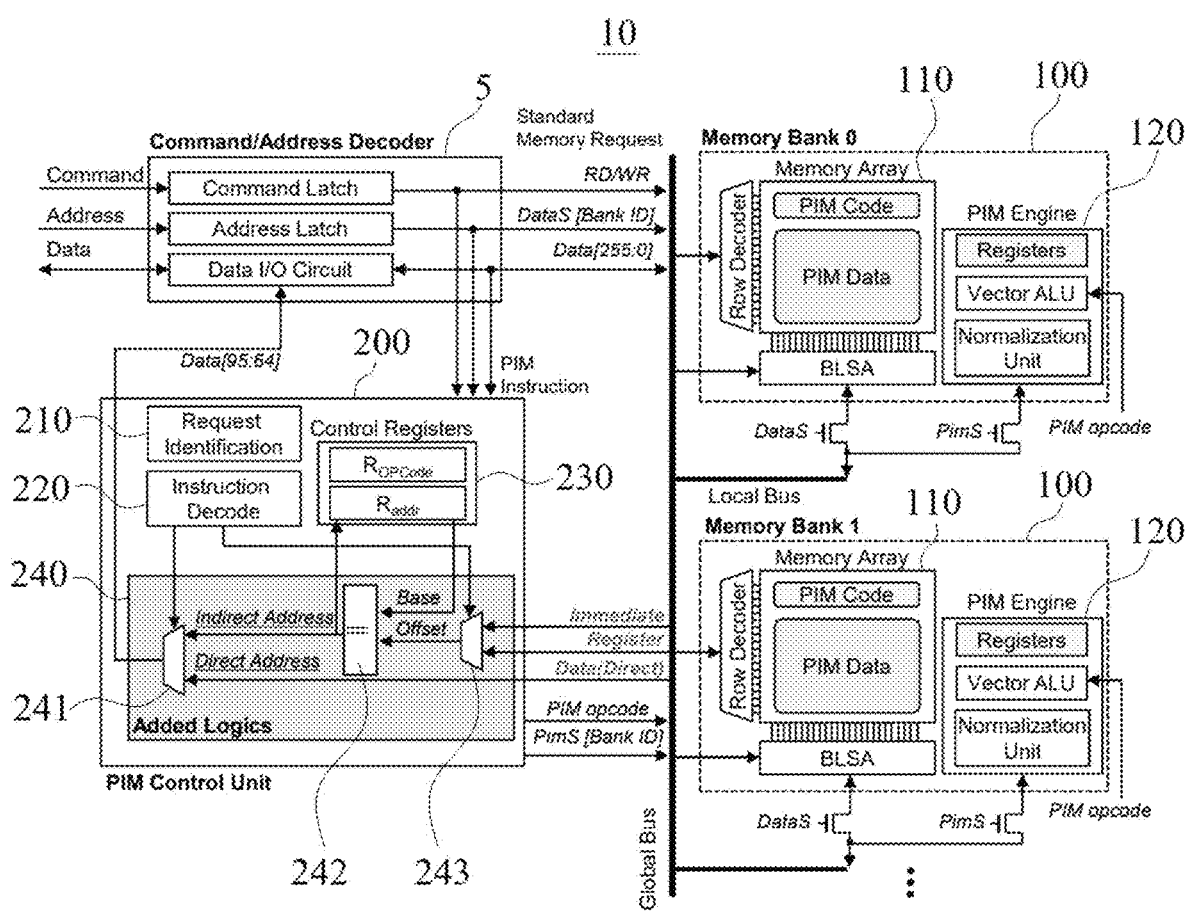
FIG. 3 is a view showing a processing-in-memory memory device according to an embodiment of the present invention.

FIG. 3 is a view showing a processing-in-memory memory device 10 according to an embodiment of the present invention.

The processing-in-memory memory device 10 may include a memory bank 100 and a processing-in-memory (PIM) control unit 200.

Referring to FIG. 3, a memory controller 5 manages data transmission between the CPU and the memory bank 100. The memory controller 5 may generate a standard memory request to access data in the memory bank 100 by decoding data, address, and instruction signals received from the CPU. Generally, the standard memory request may include a memory operation type (read or write expressed as RD/WR), a memory address to be accessed (DataS (Bank ID)), and data transmission between the CPU and the memory.

A global bus performs a function of transmitting information (standard memory request) decoded by the memory controller 5, i.e., DataS (bank ID) and RD/WR, to the memory bank 100, i.e., functions as a communication channel between the memory controller 5 and the memory bank 100. Unlike this embodiment, the processing-in-memory memory device 10 may be configured to further include the memory controller 5 described above.

Each memory bank 100 is a place where data is stored and may include a memory array 110 and a PIM engine 120 that performs computing tasks within the memory bank 100. The memory bank 100 is connected to the global bus and may receive information decoded by the memory controller 5. The memory array 110 is a place in the memory bank 100 where data is stored. The portions labeled "PIM Code" and "PIM Data" indicate areas in which these sections of the memory array 110 are reserved to store a PIM instruction and related data, respectively. The PIM engine 120 performs a function of directly executing the PIM operation within the memory bank 100. The PIM engine 120 may include registers, a vector ALU (arithmetic logic unit), and a normalization unit. The registers of the PIM engine 120 are small and fast storage elements that temporarily store data and PIM operands during the PIM operation. The vector ALU is a special hardware device that performs arithmetic and logical operations on vector data. Through the vector ALU, the PIM engine 120 may increase overall computing speed by executing the PIM operation efficiently and in parallel. The normalization unit performs a function of converting PIM operation results into a normalized format that can be used by the CPU or other system components. Since the PIM engine 120 may directly execute operations on the data stored in the memory bank 100, the need of transferring data between the memory and the CPU is not required.

A first switch (DataS) and a second switch (PimS) control data access to the memory array 110 and the PIM engine 120. When a standard memory request is generated by the memory controller 5, the first switch DataS is activated and allows access to the memory array 110. The first switch (DataS) controls access of the global bus to the memory array 110. When the standard memory request is received, the first switch (DataS) connects the memory array 110 to the global bus to perform a requested operation. The second switch (PimS) controls access to the PIM engine 120. When the processing-in-memory (PIM) control unit 200 recognizes a PIM instruction, the second switch (PimS) is activated, and the second switch (PimS) connects the PIM engine 120 to the memory array 110 so that the PIM engine 120 may directly access the data stored in the memory array 110.

The processing-in-memory control unit 200 performs a function of managing and executing processing-in-memory operations. When the memory controller 5 transmits a request to the PIM control unit 200, the request includes a unique identifier indicating that the request contains a PIM instruction, not a standard memory operation. The PIM control unit 200 may distinguish the PIM instruction from the standard memory request through the unique identifier. The PIM instruction is designed to directly perform processing operations within a memory subsystem and thus is different from a standard memory request such as a read or write operation. To distinguish the PIM instruction from a standard memory request, the PIM control unit 200 generally uses specific instruction encoding, an opcode, or a control signal as a unique identifier that the PIM instruction has. In this way, when the PIM control unit 200 receives an instruction, it may determine whether the instruction is a standard memory request or a PIM instruction and process it accordingly.

Particularly, in this embodiment, the PIM control unit 200 may generate an effective address in an indirect addressing mode in association with the memory controller 5 and the memory bank 100. The PIM control unit 200 may store whether or not to use an indirect address by expanding the PIM instruction. Specifically, when an indirect addressing mode is used, the PIM control unit 200 may define a base register by expanding the opcode area of the PIM instruction and allocate the address area of the PIM instruction as an offset area. This will be further described below.

The PIM control unit 200 may include a request identification unit 210, an instruction decoding unit 220, control registers 230, and an effective address generation unit 240 capable of generating an effective address by selectively using an indirect address and a direct address. In some embodiments, each of the PIM control unit 200, the request identification unit 210, the instruction decoding unit 220, and the effective address generation unit 240 comprises hardware circuitry configured to perform one or more functions and/or operations as described herein.

The request identification unit 210 performs a function of distinguishing a PIM instruction from a standard memory request. When the PIM control unit 200 receives a request from the memory controller 5, the request identification unit 210 may confirm whether the incoming request contains a PIM instruction by inspecting the request in a method of looking for the unique identifier described above. When a PIM instruction is identified, the request identification unit 210 may transfer the PIM instruction to the instruction decoding unit 220 for additional processing.

The instruction decoding unit 220 may decode the PIM instruction and extract essential information such as an operation type (e.g., a control signal (PIM opcode) for executing a PIM operation), an operand, and a target address (e.g., bank ID). In addition, the instruction decoding unit 220 of this embodiment may extract and store whether an indirect address is used and a data path for indirect address operation from a decoding result. In addition, the instruction decoding unit 220 may confirm whether the PIM instruction is valid and can be executed within the memory subsystem (memory bank 100).

The control registers 230 may store and manage control information needed for executing the PIM instruction. Operation of these control registers 230 may include storing intermediate results, status flags, and other configuration data related to operation of the PIM instruction. For example, the control signal (PIM opcode) extracted by the instruction decoding unit 220 may be stored in the control register 230 as $R_{opcode}$ (register opcode), and the target address may be stored as $R_{addr}$ (register address). That is, $R_{addr}$ may have a memory address for executing the PIM operation, and $R_{opcode}$ may have a PIM opcode that indicates a specific PIM operation to be performed. The control registers 230 may interface with the request identification unit 210 and the instruction decoding unit 220 to provide needed control information. In addition, the control registers 230 interact with the memory bank 100 and the effective address generation unit that can selectively generate an indirect address or a direct address so that the PIM instruction may be executed correctly.

The PIM control unit 200 may transmit the PIM opcode and a PimS (bank ID) signal to the global bus. The PIM opcode may instruct the PIM engine 120 in the specified memory bank (identified by the bank ID) to execute a desired PIM operation.

The PIM control unit 200 operates together with other components of the processing-in-memory memory device 10 of this embodiment to allow an efficient PIM operation. That is, the PIM control unit 200 recognizes and decodes the PIM instruction so that the PIM engine 120 may receive correct information and directly execute PIM operation on the data stored in the memory bank 100. As a result, the overall system performance is improved by reducing the need of data transmission between the CPU and the memory.

Figure 4:
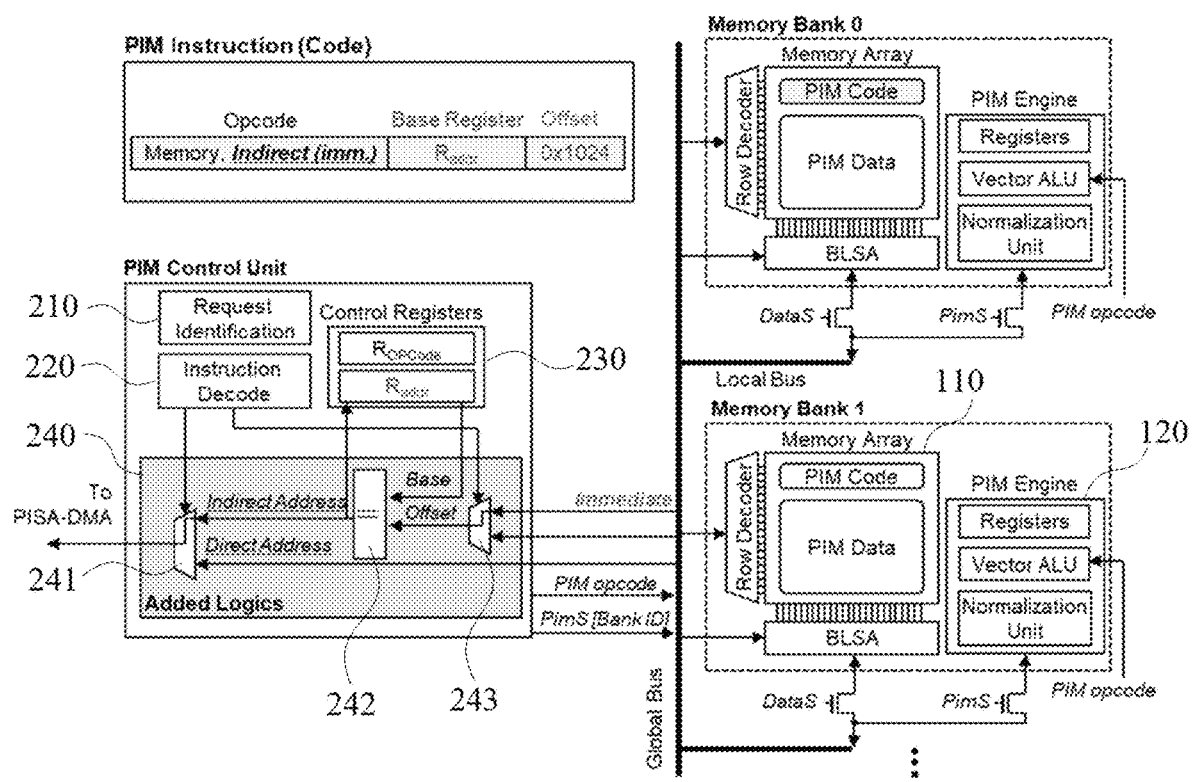
FIG. 4 is a view showing an example of performing an indirect addressing mode by the processing-in-memory memory device shown in FIG. 3.
Figure 5:
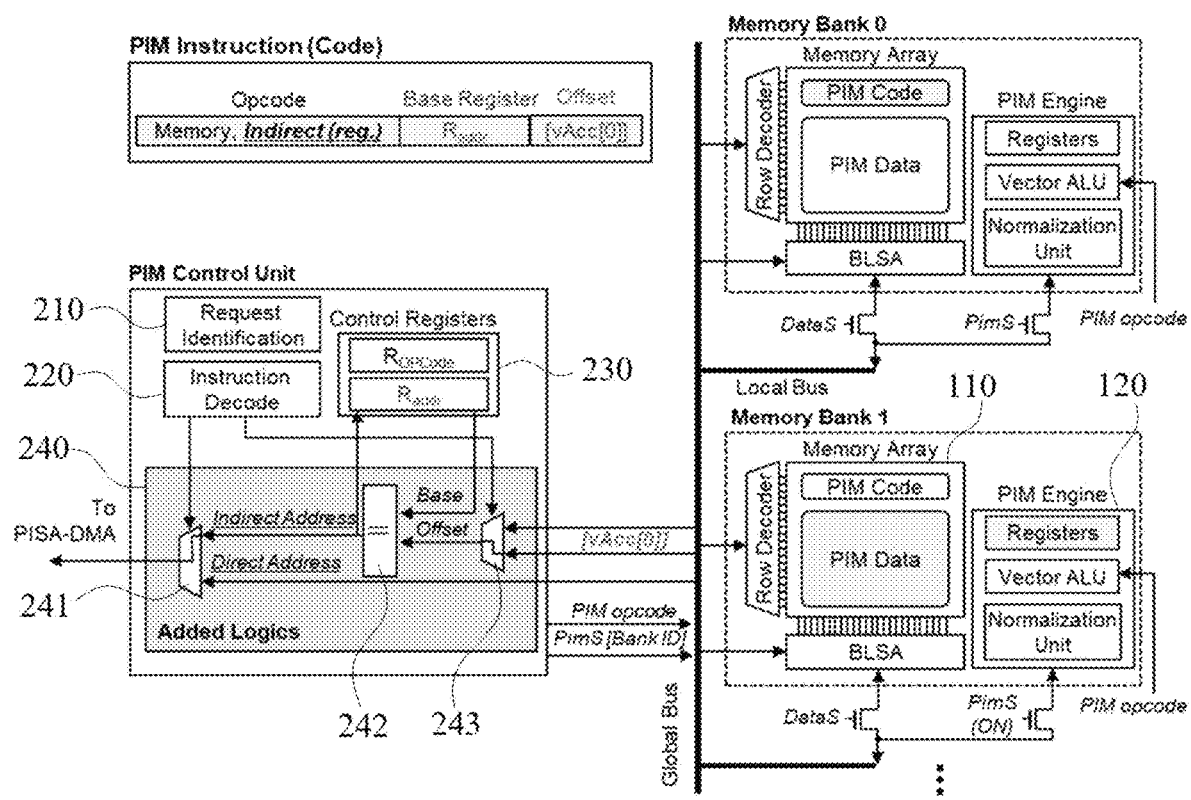
FIG. 5 is a view showing another example of performing an indirect addressing mode by the processing-in-memory memory device shown in FIG. 3.

FIG. 4 is a view showing an example of generating an indirect address by the processing-in-memory memory device shown in FIG. 3. FIG. 5 is a view showing another example of generating an indirect address by the processing-in-memory memory device shown in FIG. 3.

Referring to FIGS. 4 and 5, the PIM control unit 200 of this embodiment may further include an effective address generation unit 240 for generating an effective address by selectively using an indirect address or a direct address as described above. Specifically, the effective address generation unit 240 may include an addressing mode selection unit 241, an indirect address calculation unit 242, and an offset value selection unit 243. In some embodiments, each of the addressing mode selection unit 241, the indirect address calculation unit 242, and the offset value selection unit 243 comprises hardware circuitry configured to perform one or more functions and/or operations as described herein.

The addressing mode selection unit 241 may select an indirect or direct addressing mode according to a result of decoding the PIM instruction. For example, as described above, the PIM instruction that the request identification unit 210 has identified from a standard memory request is transferred to the instruction decoding unit 220, and the instruction decoding unit 220 may decode the PIM instruction and store addressing mode selection information from the decoding result. The addressing mode selection information may include an indirect address use signal (e.g., the "Indirect" part in the PIM Instruction (Code) in FIGS. 4 and 5) and an offset value path (datapath) for specifying indirect addressing (e.g., the "imm," and "reg." parts in the PIM Instruction (Code) in FIGS. 4 and 5). The addressing mode selection unit 241 may use the indirect address use signal ("Indirect") received from the instruction decoding unit 220 as a control signal to output a direct address received from the global bus according to the direct addressing mode or output an indirect address transferred from the indirect address calculation unit 242 as an effective address.

When the indirect addressing mode is selected by the addressing mode selection 241, unit the indirect address calculation unit 242 may calculate an indirect address by loading the base value and the offset value. At this point, the indirect address calculation unit 242 may be a concatenation circuit for calculating an indirect address. For example, the indirect address calculation unit 242 adds the bits of the base register value and the offset value in hardware as base-plus-offset (concatenation). The indirect address calculation unit 242 may calculate an indirect address by reading $R_{addr}$ stored in the control register 230 in the PIM control unit 200 as the base register value and adding the base register value and the offset value transferred from the offset value selection unit 243.

The offset value selection unit 243 may select an offset value loading path. The offset value selection unit 243 may be implemented as a multiplexer (MUX) for selecting a value that will be used as an offset value. The multiplexer (MUX) is an electronic circuit component that selects one of several input signals and transmits the input signal to a single output line. For example, the offset value selection unit 243 may receive a data path (datapath) stored in the instruction decoding unit 220, i.e., the "imm," or "reg." signal described above, as a control signal for selecting a path according to the result of decoding the PIM instruction. In addition, the immediate value that can be included in the PIM instruction itself and the register value of the PIM engine 120 of the memory bank or the data value of the memory bank may be input into the offset value selection unit 243. The offset value selection unit 243 may output an immediate value, i.e., the immediate value (Immediate) stored in the PIM instruction itself, as an offset value when the control signal is "imm," and select the value stored in the register of the PIM engine 120 or the data value of the memory bank 100 and output the selected value as an offset value when the control signal is "reg.".

FIG. 4 is a view showing a method of generating an effective address in an indirect addressing mode by the PIM control unit 200 shown in FIG. 3, and using an immediate value as an offset value. When the indirect address access mode ("Indirect") is used from a result of decoding the PIM instruction, and it is assumed that the PIM instruction is configured of a control unit (Opcode) and an address (address), the PIM control unit 200 may define the base register area by expanding the Opcode area of the PIM instruction, and allocate the address area (field) as the offset area. In the example shown in FIG. 4, the base register area stores the index of the register ($R_{addr}$) that stores the base address value in the PIM control device. The Offset area stores the immediate value (constant value (e.g., 0x1024)) of the instruction. An indirect address is calculated through concatenation of the value of the base register stored in the control register 230 and the X output of the offset selection unit. First, the base address is stored in the control register 230. When the PIM instruction execution engine (PISA-DMA) reads the PIM instruction from the memory, the indirect address is calculated and transferred to the DMA through the address/instruction decoder in the memory controller, and at the same time, the calculated address is stored in the control register 230. The memory controller 5 executes the PIM instruction in response to the request of the DMA.

FIG. 5 is a view showing an example of generating an effective address in an indirect addressing mode by the PIM control unit 200 shown in FIG. 3, and using the register value of the PIM operator as an offset value. The base register area stores the index value of the control register 230 that stores the base address in the same manner as described in FIG. 4. Using the CPU or DMA, the offset is read from a register or a bank of the operator where the offset of the indirect address is stored, and stored in the offset area of the PIM instruction or in the LSB area of the control register 230. The next process is the same as the process described in FIG. 4. That is, the base address is stored in the control register 230. When the PIM instruction execution engine (PISA-DMA) reads the PIM instruction from the memory, the indirect address is calculated and transferred to the DMA through the address/instruction decoder in the memory controller, and at the same time, the calculated address is stored in the control register 230. The memory controller 5 executes the PIM instruction in response to the request of the DMA.

Figure 6:
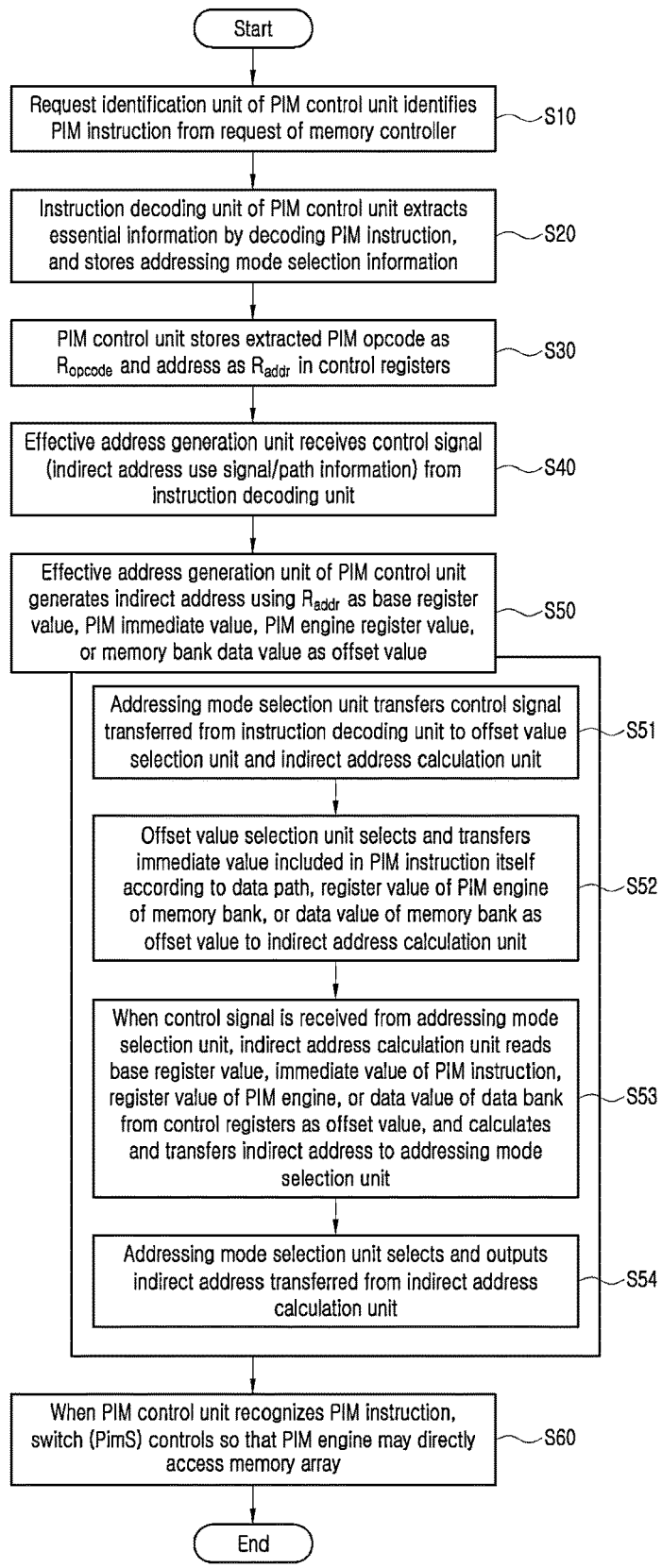
FIG. 6 is a flowchart illustrating a method of performing an indirect addressing mode in a processing-in-memory memory device according to an embodiment of the present invention.

FIG. 6 is a flowchart illustrating a method of performing an indirect addressing mode in a processing-in-memory memory device according to an embodiment of the present invention.

The memory controller 5 may generate a standard memory request by decoding the data, address, and instruction signals received from the central processing unit (CPU). For the memory bank 100 including the memory array 110 and the PIM engine 120 that directly executes the processing-in-memory according to a PIM instruction, access to the memory array 110 through the global bus may be controlled by the first switch (DataS) in response to the standard memory request.

In the method of performing the indirect addressing mode by the processing-in-memory memory device 10 of this embodiment, first, the request identification unit 210 of the processing-in-memory control unit may identify the PIM instruction by decoding the data, address, and instruction signals received from the central processing unit (CPU), and inspecting the request incoming from the memory controller 5 that generates the standard memory request (S10). Then, the instruction decoding unit 220 of the processing-in-memory control unit may decode the identified PIM instruction, extract essential information including a control signal (PIM opcode), an operand, and a target address (bank ID) indicating a specific PIM operation to be performed, and extract and store an indirect address use signal and a data path (datapath) for calculating an indirect address as addressing mode selection information (S20). Next, the processing-in-memory control unit may store the control signal (PIM opcode) extracted by the instruction decoding unit 220 as $R_{opcode}$ (register opcode) of the control register 230, and store the target address as $R_{addr}$ (register address) (S30). Then, the effective address generation unit 240 of the processing-in-memory control unit may receive the indirect address use signal from the instruction decoding unit 220 (S40). Subsequently, the effective address generation unit 240 of the processing-in-memory control unit may generate an indirect address by using the $R_{addr}$ as the base register value, and reading and using the immediate value contained in the PIM instruction, the register value of the PIM engine 120, or the data value of the memory bank 100 as the offset value (S50). In addition, when the PIM control unit 200 recognizes the PIM instruction, it may control to connect the PIM engine 120 to the memory array 110 by means of the switch (PimS) so that the PIM engine 120 may directly access the data stored in the memory array 110 (S60).

The process of generating an indirect address by the effective address generator 240 may be implemented, for example, as follows. First, the addressing mode selection unit 241 of the effective address generation unit 240 may transmit a control signal to the offset value selection unit and the indirect address calculation unit using the data path and the indirect address use signal for calculating an indirect address received from the instruction decoding unit 220 as a control signal (S51).

The offset value selection unit 243 of the effective address generation unit 240 may select an offset value loading path using the data path received from the instruction decoding unit 220 to calculate an indirect address as a control signal, select the immediate value (Immediate) that can be included in the PIM instruction itself according to the data path, the register value of the PIM engine 120 of the memory bank, or the data value of the memory bank 100 as an offset value, and transfer the selected information to the indirect address calculation unit 242 (S52).

In addition, when the indirect address use signal is transferred from the addressing mode selection unit 241, the indirect address calculation unit 242 of the effective address generation unit 240 may calculate an indirect address in a method of concatenating the base register value and the offset value input from the control registers 230 and transfer the indirect address to the addressing mode selection unit 241 (S53). Accordingly, the addressing mode selection unit 241 may select and output the indirect address calculated and transferred from the indirect address calculation unit (S54).

Figure 7:
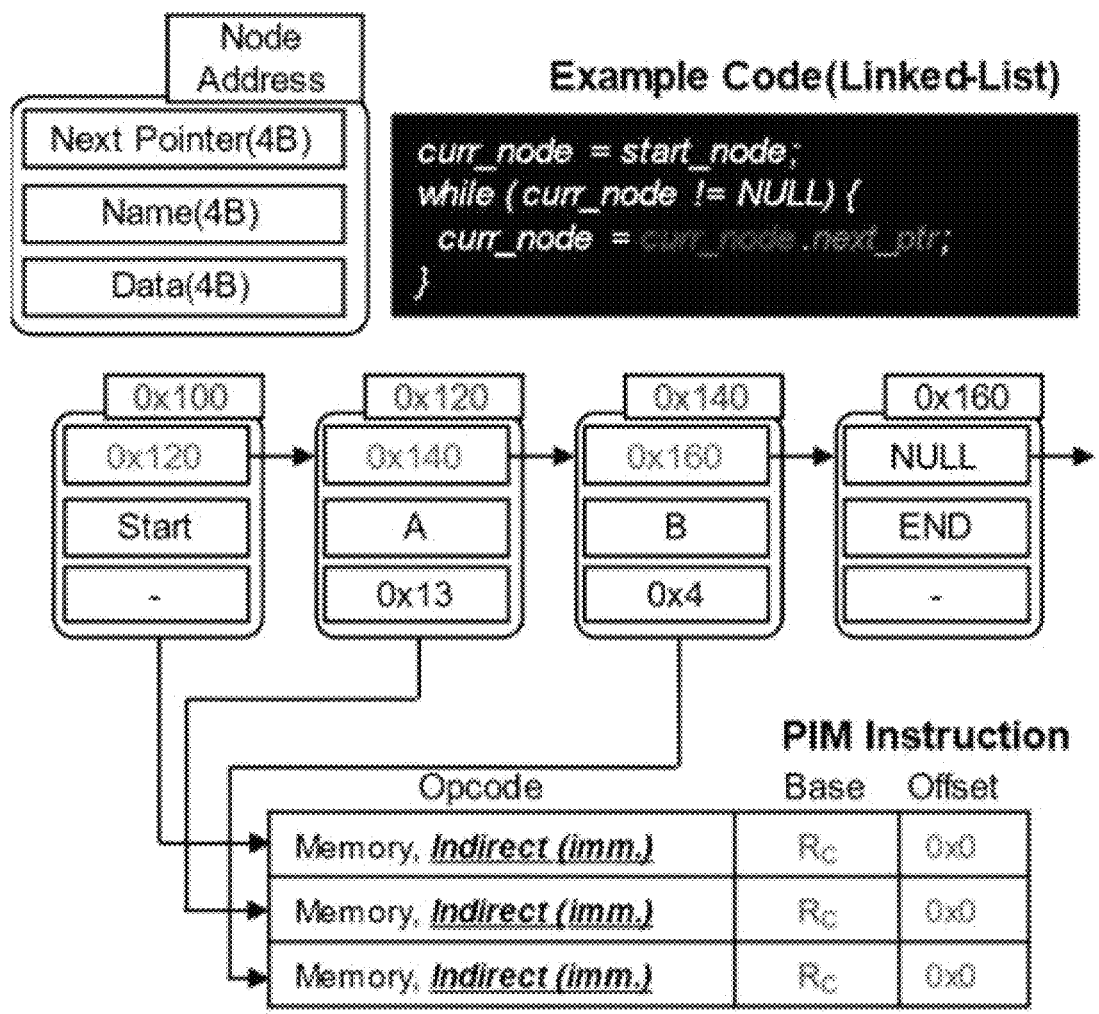
FIG. 7 is a view showing an example of applying the processing-in-memory memory device and the method of performing an indirect addressing mode in the processing-in-memory memory device described in FIGS. 3 to 6 to data of a struct type.

FIG. 7 is a view showing an example of applying the method of performing an indirect addressing mode in the processing-in-memory described in FIGS. 3 to 6 and the processing-in-memory memory device 10 performing the same to data of a struct type.

When a PIM instruction is generated using the indirect address access mode according to embodiments of the present invention, the processing-in-memory device may provide programmability of data structures such as graphs, arrays, structs, and the like. Like the linked-list used in the example code of FIG. 7, it is possible to access data structures used in deep learning applications. A next node may be sequentially accessed by adding an offset value on the basis of the starting node.

Figure 8:
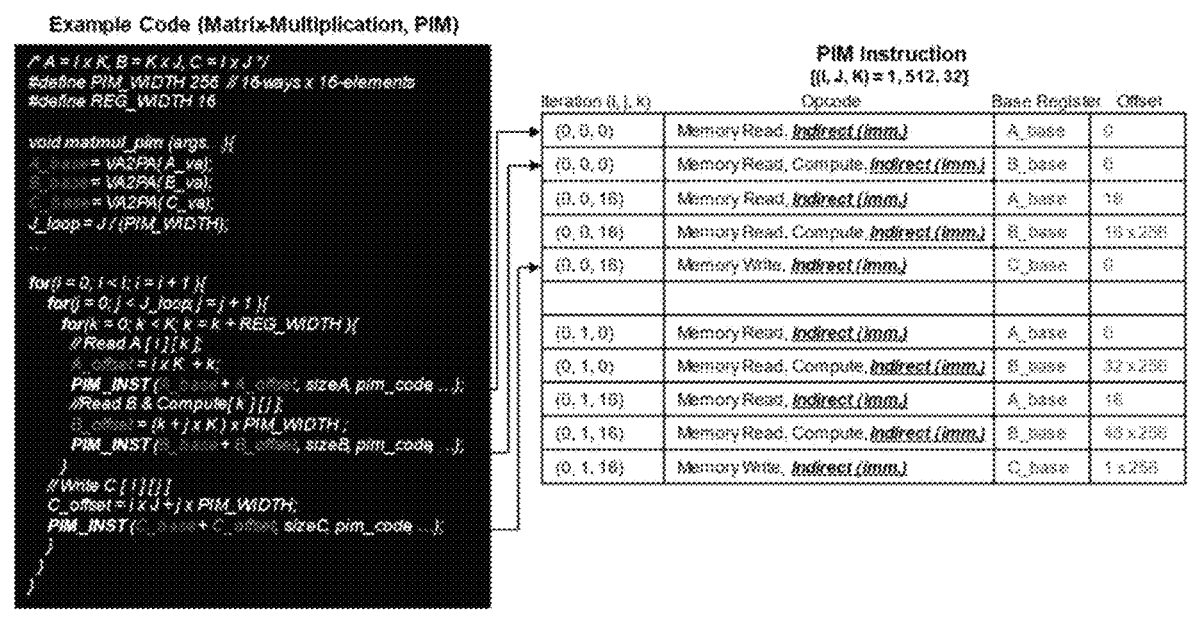

FIG. 8 is a view showing an example of accomplishing simplification of the execution method of a matrix operation by the method of performing an indirect addressing mode in the processing-in-memory and the processing-in-memory memory device 10 that performs the same described in FIGS. 3 to 6.

When a PIM instruction is generated in a direct address access mode, there is an overhead of copying a code area to the memory and redundantly storing information at each runtime. When a PIM instruction is generated in an indirect address access mode according to embodiments of the present invention, the off-loading overhead of the processing-in-memory device is reduced by storing only the starting address of the matrix (dynamically generated information) in the control register 230 at run time, after storing the offset value in the instruction during the compilation process.

Figure 9:
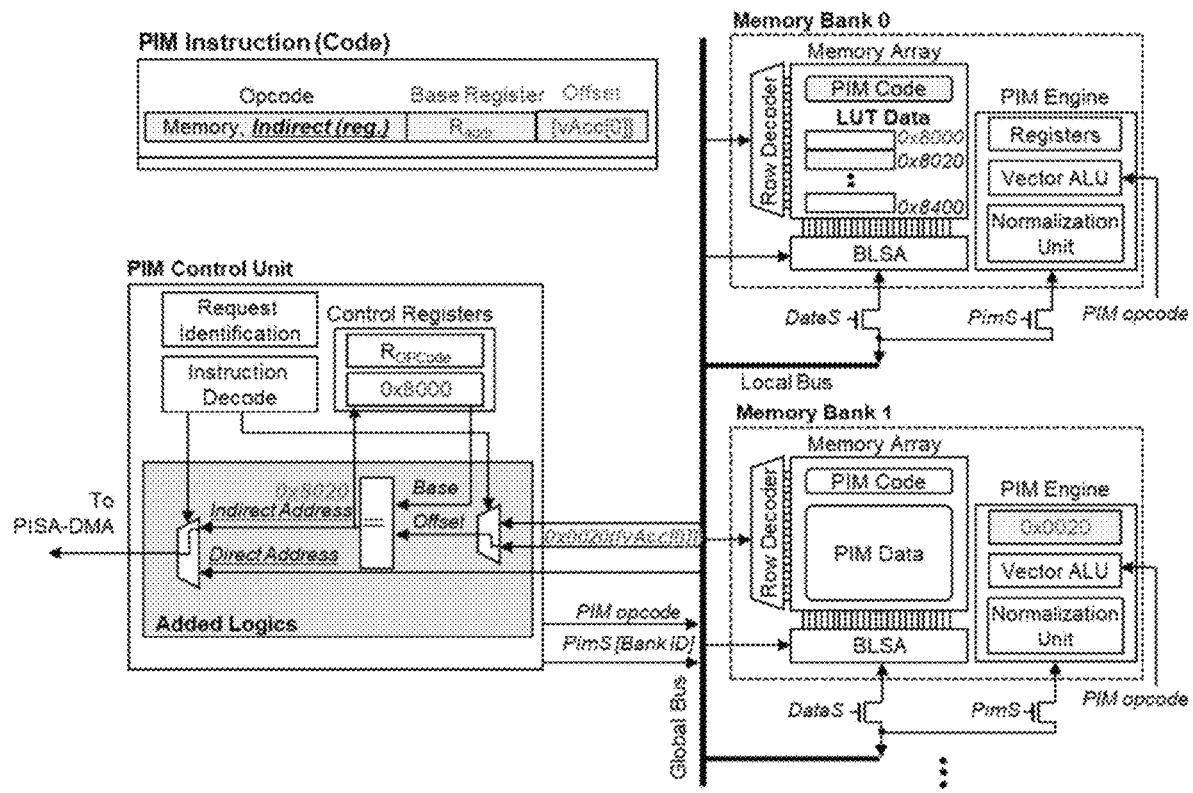
FIG. 9 is a view showing an example of applying the processing-in-memory memory device and the method of performing an indirect addressing mode in the processing-in-memory memory device described in FIGS. 3 to 6 to a LUT technique.

FIG. 9 is a view showing an example of applying the method of performing an indirect addressing mode in the processing-in-memory and the processing-in-memory memory device 10 that performs the same described in FIGS. 3 to 6 to a look-up table (LUT) technique.

When a PIM instruction is generated in an indirect address access mode according to embodiments of the present invention, operation of nonlinear functions of a processing-in-memory device applying a look-up table (LUT) may be supported. The LUT operation method is mainly applied to operation of nonlinear functions with high computational complexity, and performs operation by storing previously calculated results in the memory, accessing the memory using an input value as an address, and reading a result of operation. For example, when input (x) is a natural number between 0 and 10, $3^0, 3^1, 3^2, 3^3, \ldots 3^{10}$ are stored in the memory at the addresses 0 to 10 respectively to calculate an exponential function (f(x)=3x). When the direct addressing mode is applied, an overhead of the PIM engine 120 to search all the addresses is generated to access all the data in the LUT. However, when the indirect addressing mode according to an embodiment of the present invention is applied, it is possible to access a memory block corresponding only to the address of an input without searching the entire LUT memory. For example, in FIG. 9, $R_{addr}$ (0x8000) may be used as the base value of the LUT, and $R_c$ (0x0020) may be used as the offset value of the LUT.

The description of the present invention described above is for illustrative purposes, and those skilled in the art will understand that the present invention may be easily modified in other specific forms without changing the technical spirit or essential features of the present invention. Therefore, the embodiments described above should be understood in all respects as illustrative and not restrictive. For example, each component described as a single form may be implemented in a distributed manner, and similarly, components described as distributed may also be implemented in a combined form.

The scope of the present invention is indicated by the patent claims described below, and all changes or modified forms derived from the meaning and scope of the claims and their equivalent concepts should be construed as being included in the scope of the present invention.

DESCRIPTION OF SYMBOLS

5: Memory controller
10: Processing-in-memory memory device
100: Memory bank
110: Memory array
120: PIM engine
200: Processing-in-memory control unit
210: Request identification unit
220: Instruction decoding unit
230: Control register
240: Effective address generation unit
241: Addressing mode selection unit
242: Indirect address calculation unit 243: Offset value selection unit
DataS: First switch
PimS: Second switch

The invention claimed is:
1. A processing-in-memory memory device, comprising:
a memory bank configured to execute (i) a standard memory request, generated by a memory controller which is configured to receive data, address, and instruction signals from a central processing unit (CPU), and (ii) a processing-in-memory (PIM) instruction, the memory bank including:
  a memory array configured to receive the standard memory request through a global bus, and
  a PIM engine configured to directly execute processing-in-memory according to the PIM instruction within the memory bank; and
a PIM control unit configured to control the processing-in-memory of the PIM engine by:
  identifying a PIM instruction corresponding to a request received from the memory controller, and
  selecting one among an indirect addressing mode and a direct addressing mode according to the identified PIM instruction,
wherein, when the indirect addressing mode is selected, the PIM control unit is configured to:
  use a register value of the PIM control unit as a base register value,
  use an immediate value in the PIM instruction, a register value of the PIM engine, or a data value of the memory bank as an offset value, and
  generate an effective address for the processing-in-memory in the indirect addressing mode.

2. The device according to claim 1, wherein
when the indirect addressing mode is selected, the PIM control unit is configured to:
  define a base register area by expanding an opcode area of the PIM instruction, and
  allocate and store an address area of the PIM instruction as an offset area.

3. The device according to claim 1, wherein the PIM control unit includes:
  a request identification unit configured to identify the PIM instruction by inspecting the request coming from the memory controller;
  an instruction decoding unit configured to, by decoding the identified PIM instruction:
    extract a control signal, an operand, and a target address, and
    extract and store an indirect address use signal, and a data path for calculating an indirect address;
  at least one control register configured to:
    store the control signal extracted by the instruction decoding unit as $R_{opcode}$, and
    store the target address as $R_{addr}$; and
  an effective address generation unit configured to selectively generate an effective address as either an indirect address or a direct address,
  wherein, based on the indirect address use signal received from the instruction decoding unit, the effective address generation unit is configured to generate the effective address in the indirect addressing mode as an indirect address determined by
    using the $R_{addr}$ as the base register value, and
    using the immediate value in the PIM instruction, the register value of the PIM engine, or the data value of the memory bank as the offset value.

4. The device according to claim 3, wherein the effective address generation unit includes:
  an addressing mode selection unit configured to, based on the indirect address use signal received from the instruction decoding unit,
    select the direct addressing mode and output the direct address as the effective address, or
    select the indirect addressing mode and output the indirect address as the effective address;
  an indirect address calculation unit configured to, when the indirect addressing mode is selected by the addressing mode selection unit,
    calculate the indirect address using the base register value $R_{addr}$ input from the at least one control register and the offset value, and
    transfer the indirect address to the addressing mode selection unit; and
  an offset value selection unit configured to:
    select the immediate value included in the PIM instruction, the register value of the PIM engine of the memory bank, or the data value of the memory bank as the offset value according to the data path received from the instruction decoding unit, and
    transfer the offset value to the indirect address calculation unit.

5. The device according to claim 4, wherein
the addressing mode selection unit is configured to output the indirect address in response to a predetermined value of the indirect address use signal, and
the offset value selection unit is configured to
  output the immediate value in the PIM instruction as the offset value in response to the data path having a first predetermined value, and
  select and output the register value stored in a register of the PIM engine or the data value of the memory bank as the offset value in response to the data path having a second predetermined value.

6. A method of performing an indirect addressing mode in a processing-in-memory (PIM) memory device comprising a memory bank including a memory array and a PIM engine configured to directly execute processing-in-memory according to a PIM instruction, and a PIM control unit configured to control the memory bank, the method comprising:
  identifying, by a request identification unit of the PIM control unit, the PIM instruction by inspecting a request incoming from a memory controller;
  decoding, by an instruction decoding unit of the PIM control unit, the identified PIM instruction, to
    extract a control signal, an operand, and a target address, and
    extract and store an indirect address use signal and a data path for calculating an indirect address;
  storing, by at least one control register of the PIM control unit,
    the extracted control signal as $R_{opcode}$, and
    the target address as $R_{addr}$; and
  receiving, by an effective address generation unit of the PIM control unit, the indirect address use signal from the instruction decoding unit; and
  generating, by an effective address generation unit of the PIM control unit, an indirect address by
    using the $R_{addr}$ as a base register value, and
    using an immediate value in the PIM instruction, a register value of the PIM engine, or a data value of the memory bank as an offset value.

7. The method according to claim 6, further comprising:
controlling, in response to the PIM control unit recognizing the PIM instruction, to connect the PIM engine to the memory array by a switch to enable the PIM engine to directly access data stored in the memory array.

8. The method according to claim 6, wherein the generating the indirect address includes:
selecting and transferring, by an offset value selection unit of the effective address generation unit and based on the data path received from the instruction decoding unit, the immediate value included in the PIM instruction, the register value of the PIM engine of the memory bank, or the data value of the memory bank as the offset value to an indirect address calculation unit of the effective address generation unit;
calculating, by the indirect address calculation unit of the effective address generation unit, the indirect address by concatenating the base register value input from the at least one control register and the offset value input from the offset value selection unit;
transferring, by the indirect address calculation unit, the calculated indirect address to an addressing mode selection unit of the effective address generation unit; and
selecting and outputting, by the addressing mode selection unit and based on the indirect address use signal received from the instruction decoding unit, the indirect address transferred from the indirect address calculation unit.

\* \* \* \* \*